US011475518B2

(12) United States Patent
Mintz et al.

(10) Patent No.: US 11,475,518 B2
(45) Date of Patent: Oct. 18, 2022

(54) METHOD AND APPARATUS FOR COMPUTING A VALUE OF A TRADED ITEM

(75) Inventors: Sagy Pundak Mintz, Lincolnshire, IL (US); Michael J. Burns, Riverside, IL (US)

(73) Assignee: TRADING TECHNOLOGIES INTERNATIONAL, INC., Chicago, IL (US)

( * ) Notice: Subject to any disclaimer, the term of this patent is extended or adjusted under 35 U.S.C. 154(b) by 175 days.

(21) Appl. No.: 12/702,780

(22) Filed: Feb. 9, 2010

(65) Prior Publication Data

US 2011/0196765 A1 Aug. 11, 2011

(51) Int. Cl.
*G06Q 40/04* (2012.01)
*G06Q 30/02* (2012.01)
*G06Q 40/06* (2012.01)
*G06Q 40/00* (2012.01)

(52) U.S. Cl.
CPC ......... *G06Q 40/04* (2013.01); *G06Q 30/0278* (2013.01); *G06Q 30/0283* (2013.01); *G06Q 40/06* (2013.01); *G06Q 40/12* (2013.12)

(58) Field of Classification Search
CPC ........ G06Q 40/04; G06Q 40/06; G06Q 40/12; G06Q 30/0278; G06Q 30/0283
See application file for complete search history.

(56) References Cited

U.S. PATENT DOCUMENTS

| | | | |
|---|---|---|---|
| 7,624,052 B1 * | 11/2009 | Seaman et al. | 705/35 |
| 2004/0230513 A1 * | 11/2004 | Davin et al. | 705/37 |
| 2005/0144112 A1 * | 6/2005 | Singer et al. | 705/37 |
| 2005/0283421 A1 * | 12/2005 | Hatheway et al. | 705/37 |
| 2006/0155654 A1 * | 7/2006 | Plessis et al. | 705/400 |
| 2006/0247997 A1 * | 11/2006 | West et al. | 705/37 |
| 2006/0259396 A1 * | 11/2006 | Burns et al. | 705/37 |
| 2008/0040258 A1 * | 2/2008 | Weber et al. | 705/37 |
| 2008/0104220 A1 * | 5/2008 | Vanyukhin et al. | 709/223 |
| 2009/0216685 A1 * | 8/2009 | Rosen et al. | 705/36 R |
| 2011/0145126 A1 * | 6/2011 | Rooney | 705/37 |

* cited by examiner

*Primary Examiner* — Florian M Zeender
*Assistant Examiner* — Christopher R Buchanan
(74) *Attorney, Agent, or Firm* — McDonnell Boehner Hulbert & Berghoff LLP (57) ABSTRACT

Embodiments for determining a traded item's value are described herein. An embodiment includes identifying conditions for use in computing a value of the tradable object. The embodiment further includes determining whether a condition is satisfied based on market data, for example, and if the condition is satisfied, then determining the value of the item based on a rule associated with the condition; and if the condition is not satisfied, then determining whether a subsequent condition is satisfied. If a subsequent condition is satisfied, then determining the value of the tradable object based on a rule associated with the subsequent condition. An embodiment further includes computing an open profit and loss value based on the item's value. Other embodiments are also disclosed.

13 Claims, 4 Drawing Sheets

METHOD AND APPARATUS FOR COMPUTING A VALUE OF A TRADED ITEM

FIELD OF INVENTION

There are a number of inventions disclosed herein that are directed towards computing, displaying, or both a value for use in the field of electronic trading. More particularly, these inventions are directed towards the computation, display, or both of a traded item's current value. The item's current value may be used to, among other things, compute a profit and loss value.

BACKGROUND

An electronic trading system includes an electronic matching system for tradable items, such as stocks, options, and commodities. The electronic trading system often includes an electronic exchange to perform the order matching. The electronic exchange also provides market data and trade confirmation data, among other things, to subscribing trading devices. By way of illustration, an electronic exchange in derivatives trading is the CME® Globex® electronic trading platform, which is offered by the Chicago Mercantile Exchange Group; though the inventions described herein are not limited to derivatives trading.

To trade in an electronic trading system, a person (commonly a trader) uses a trading device to receive and electronically process data from the electronic exchange. The trading device generally outputs the information to the person via one or more display screens. The person may also interact with the computer and the information using an input device, such as a mouse or keyboard or both. For example, the person may place orders, modify orders, and delete orders at the electronic exchange using the trading device. Depending on how a trading device is configured, trading with it may require a great deal of the person's attention (e.g., as in manual style trading) or require very little or no attention (e.g., as in automated style trading), for example.

It is well known that risk management plays an important role in trading. Part of risk management involves realizing an item's current value and a trader's open profit and loss value (P&L). By way of example, at the end of a trading day in derivatives trading, a clearing firm determines a trader's open P&L. (As known in the art, a clearing firm is an organization that guarantees the trades executed on an exchange.) Open P&L refers to the profit and loss value of a trader's open position, and the value is based on the item's current value, the trader's open position, and the average price that it took to get into that position. The clearing firm will often use the settlement price as the item's current value, where the settlement price is the official price of the item at the end of a day's trading session. The open P&L is then used to determine whether the trader's margin requirement is met. If the margin requirement is not met, then the trader may have to (undesirably) contribute the necessary amount of margin. As such, it is important for a trader to know his or her open P&L, so that his or her margin can be maintained, if possible, without additional contributions to the margin account.

Unfortunately, the settlement price is not known until the end of the day's trading session, and therefore, the trader is left estimating his or her open P&L during the trading session. Sometimes, however, current risk management systems poorly estimate the item's current value, thereby resulting in an exaggerated open P&L (in either direction). According to such systems, an estimation of the item's value may be particularly overstated when the bid-ask spread is wide, the market is thinly traded, and/or the market moves without trades.

There is a need for a more reliable procedure for estimating a value of a traded item. The item's value can then be used to, among other things, determine the trader's open P&L.

SUMMARY

There are a number of embodiments described herein. The embodiments include a method, system, apparatus, or computer readable medium for determining a traded item's value.

For example, at least one embodiment provides receiving market data from an electronic exchange, where the market data comprises at least one of the following data for a tradable object: a best bid price, a best ask price, and a last traded price; identifying a plurality of conditions, where each condition of the plurality of conditions comprises a rule; determining which of the plurality of conditions is satisfied based on the market data; and responsively, determining the value of the tradable object based on a rule associated with the satisfied condition.

In another example, at least one embodiment provides receiving market data from an electronic exchange, wherein the market data comprises at least one of the following data for a tradable object: a best bid price, a best ask price, and a last traded price; identifying a plurality of conditions for use in computing a value of the tradable object, where the plurality of conditions comprises a first condition and a second condition; determining whether the first condition is satisfied based on the market data, and if so, determining the value of the tradable object based on a first rule; and if not, subsequently, determining that the second condition is satisfied based on the market data and determining the value of the tradable object based on a second rule, where the first rule and the second rule are different; and computing a profit and loss value for the tradable object based on the value of the tradable object.

Other embodiments, and aspects thereof, of the various inventions are described below. In addition, modifications may be made to the described embodiments without departing from the spirit or scope of the inventions.

BRIEF DESCRIPTION OF THE DRAWINGS

The following will be better understood by a person skilled in the art when read in conjunction with the figures which show various example embodiments. The figures are for the purpose of illustrating example systems and methods according to certain embodiments, but it is understood that the various inventions, described herein, are not limited to the arrangements and instrumentality shown in the figures.

DETAILED DESCRIPTION

There are a number of inventions described herein that relate to the computation, display, or both of a traded item's value. The item's value may be used to compute, among other things, an open profit and loss value (P&L). The inventions include devices, systems, methods, and computer program products that calculate an open P&L by using a more intelligent and reliable determination of the item's current value. An item includes a tradable object, which is further defined at the end of this section.

Before explaining any further, it is worth noting again that the various inventions are not limited in their application to the details of design and the arrangement of the components set forth in the following description or illustrated in the drawings. The inventions are capable of other embodiments or of being practiced or carried out in various ways.

Figure 1:
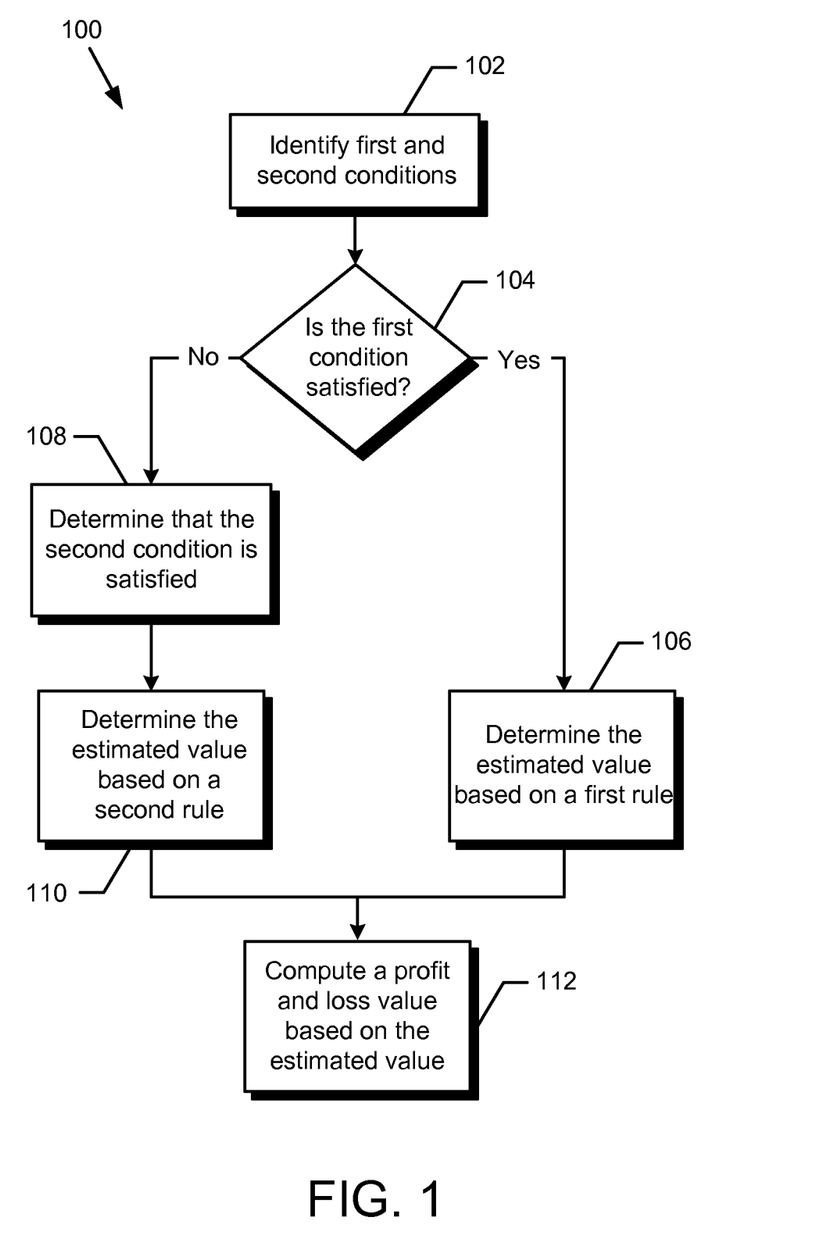
FIG. 1 is a flowchart illustrating operations performed to determine, among other things, an item's value, according to an embodiment.

Referring now to the drawings, FIG. 1 is a flowchart 100 illustrating operations performed by a system to determine, among other things, a traded item's value. For purposes of illustration, some examples of systems are also described below (e.g., in relation to FIGS. 2 and 3). Additionally, FIG. 1 shows an operation performed to compute an open P&L using the determined value. Other operations may be performed to compute values of interest, besides an open P&L, using the item's value.

At step 102, first and second conditions are identified. By way of example, the first condition might include: (1) the last traded price is within the bid-ask range, and the second condition might include: (2) there is a current bid and ask and the last traded price is outside of the bid-ask range. The conditions might be identified by electronically locating them in a data structure of a computer, for example.

The system may be adapted to identify or locate any configured number of conditions. In certain embodiments, for example, two conditions may be identified. In certain embodiments, three conditions may be identified. In certain embodiments, more than three conditions may be identified. Additionally, in certain embodiments, there may be a limit placed on the number of conditions that are identified; for example, a ten-condition limit may be placed on the number of conditions identified by the system.

In certain embodiments, a user can manually enter one or more of the conditions into the system; the conditions may be entered using a configuration window, for example, prior to step 102. In certain embodiments, one or more of the conditions may be hardcoded into the system. If one or more conditions are hardcoded into the system, then the user may be given the option (or not) to select which conditions he or she would like to use.

The system may be programmed to prioritize the conditions. In certain embodiments, the system looks to the highest priority condition first and then moves to the next highest priority condition if the highest priority condition is not satisfied. The system may look to each condition, according to the priority, until one of the conditions is satisfied or until all of the conditions have been exhausted, for example. In certain embodiments, a condition is satisfied (or determined to be true) when none of the previous conditions are satisfied (or true). In certain embodiments, a user can prioritize the conditions; the priority may be input using a configuration window, for example, prior to step 102. In certain embodiments, one or more of the priority assignments are hardcoded into the system, then the user may be given the option (or not) to change the priority.

It is understood that "first" and "second" are numerical identifiers used to distinguish the conditions from each other. In certain embodiments, however, the first condition also has a higher priority than the priority of the second condition. As such, it is possible that the system looks to a number of different conditions including the first condition (if so programmed) before looking to the second condition. In other words, the use of "second" before condition should not imply that the second condition comes directly after the first condition in the priority chain. It is also possible that the second condition refers to a catch-all condition; that is, it could be a condition that is satisfied when no other condition before it is satisfied.

It is also understood that the system may be configured to identify all of the conditions at substantially the same time or at different times. For example, the system may be configured to identify all of the conditions at the same time (or substantially the same time) as implied by step 102 in FIG. 1. In another example, the system may be configured to identify only the condition that will be analyzed, and will identify a second condition only if the need so arises (for example, when the first condition is not satisfied). As such, it is understood that the identification of the first and second conditions may occur at different points in time; according to these embodiments, it is possible that the second condition may not be identified if the first condition is satisfied. Irrespective of when, or if, a condition is identified, the system is configured to identify the conditions.

An example set of prioritized conditions might include: (1) the last traded price is in the bid-ask range; (2) there are valid bid and ask prices and the last traded price is outside of the bid-ask range; (3) there is a valid open price; (4) there is a valid settlement price; (5) there is a valid close price; (6) there is a valid last traded price, where the last traded price is outside of the bid-ask range and a bid or ask is missing; (7) a value has been manually entered; and (8) none of the previous conditions are satisfied. More about these conditions is described below.

At step 104, a decision is made by the system as to whether the first condition is satisfied. In certain embodiments, the system analyzes relevant market data from an electronic exchange to make the decision. Market data may include, among other values, one or more values for an item such as: a best bid price, a best ask price, a last traded price, an open price, a settlement price, and a close price. These values may be added and/or updated in a data structure of a computer. So, for example, if the first condition is whether the last traded price is within the bid-ask range, then the system will look to (or find) the following market data values in the data structure: last traded price, the best bid price, and the best ask price. Then, a decision is made by the system based on the data.

Additionally, in certain embodiments, the system may analyze a theoretical value(s) to make the decision (instead of analyzing, or in addition to analyzing, market data directly). In some embodiments, the theoretical value is computed based on the market data. In some embodiments, the theoretical value is computed based on data from a source different than the item's market. For example, the data might come from a different market or exchange. In some embodiments, the theoretical value is computed based on both market data for the item and some other source.

According to certain embodiments, it is possible that data, which is needed to determine whether a condition is satisfied, is missing. For example, a condition may call for a certain market price, but the market price is missing because the exchange did not provide it or the price itself is not available. If this kind of data is missing, then the condition may be considered not satisfied and the system may be configured to move on to the next condition.

If the first condition is satisfied, then per step 106, the item's value is determined based on a first rule, where the first rule is associated with the first condition. In some embodiments, a condition may have only a single rule that is used to determine the item's value, while in other embodiments, the condition may have two, three, four, or more rules that are all used to determine the item's value. For example, if the first condition is whether the last traded price is within the bid-ask range, and it is satisfied, then a rule might be to set the item's value to the last traded price. If there was more than one rule, then the system may base its determination on all of the rules (or a subset of them).

If the first condition is not satisfied, then the system looks to the next condition (in certain embodiments, the next condition is the condition with the next highest priority). The system will perform a substantially similar analysis as performed in relation to the first condition to determine if the next condition is satisfied. In other words, the system will look to (or find) the appropriate data values to make a decision. According to step 108, however, it is determined that the second condition is satisfied.

When it is determined that the second condition is satisfied, then per step 110, the item's value is determined based on a second rule, where the second rule is associated with the second condition and not the first condition. It is understood that "first" and "second" are numerical identifiers used to distinguish the rules from each other and to provide an association with their respective condition (e.g., the first rule(s) is associated with the first condition, whereas the second rule(s) is associated with the second condition).

At step 112, an open P&L value is computed based on the item's value. The item's value could have resulted from a rule(s) associated with either the first or second condition (e.g., per step 106 or 110). The open P&L value may be computed using at least the item's value (computed using a technique similar to that described above), the trader's open position, and the average price of that position. For example, if an item's value is determined to be $50 and the trader is long 20 contracts (which were bought at $40 each), then the open P&L is equal to ($50×20)−($40×20)=$800. Other variables may be factored into the computation of open P&L, if so desired.

In the example directly above, it is understood that a single value is computed which characterizes the item's value. This single value is used to compute a P&L value regardless of whether the position is buy-side or sell-side. However, it is possible to use the embodiments described herein to compute two values, for example, where one value is used to compute an open P&L for traders who are long and the other value is used to compute an open P&L for traders who are short.

I. An Illustrative Example

To illustrate, consider the conditions of the example above: (1) the last traded price is in the bid-ask range; (2) there are valid bid and ask prices and the last traded price is outside of the bid-ask range; (3) there is a valid open price; (4) there is a valid settlement price; (5) there is a valid close price; (6) there is a valid last traded price, where the last traded price is outside of the bid-ask range and a bid or ask is missing; (7) a value has been manually entered; and (8) none of the previous conditions are satisfied. In this example, "valid" refers to the ability to identify a particular value in a data structure, for example—and therefore, the value is not missing. As described above, these conditions may be identified in a data structure, for example.

The system decides whether the first condition is satisfied. To do so, the system collects the most recent last traded price and determines whether that price falls within the bid-ask range. In other words, the system determines whether the last traded price is greater than the best bid price and lower than the best ask price. If it is true, then the first condition is satisfied and one or more rules associated with the first condition are applied—for example, a rule might include setting the item's current value to be equal to (or substantially equal to) the last traded price. If it is not true, then the first condition is not satisfied.

The first condition may also include what to do if a bid price or an ask price cannot be identified, e.g., one of the prices is missing; in that case, an assumption can be made that the missing price is very low (if the bid price is missing) or very high (if the ask price is missing) and that the last traded price is in the bid-ask range.

If the first condition is not satisfied, then the system may look to the next highest priority condition. In this example, the system determines whether there are valid best bid and ask prices and the last traded price is outside of the bid-ask range. In other words, the system determines whether the last traded price is below the best bid price or above the best ask price. If it is true, then the second condition is satisfied and one or more rules associated with the second condition are applied—for example, a rule might include setting the item's current value to the average of the best bid and ask prices.

If the second condition is not satisfied, then the system may look to the next highest priority condition. In this example, the system determines whether there is a valid open price. If so, then a rule might include setting the item's current value to the open price.

If the third condition is not satisfied, then the system may look to the next highest priority condition. In this example, the system determines whether there is a valid settlement price. If so, then a rule might include setting the item's current value to the settlement price.

If the fourth condition is not satisfied, then the system may look to the next highest priority condition. In this example, the system determines whether there is a valid close price. If so, then a rule might include setting the item's current value to the close price.

If the fifth condition is not satisfied, then the system may look to the next highest priority condition. In this example, the system determines whether there is a valid last traded price, where the last traded price is outside of the bid-ask range and a bid or ask is missing. For example, the last traded price is below the best bid price and the ask price is not valid or missing. If so, then a rule might include setting the item's current value to the last traded price.

If the sixth condition is not satisfied, then the system may look to the next highest priority condition. In this example, the system determines whether there is a value entered by a person (e.g., a risk manager). In other words, a person might enter a price that he or she believes is a close estimation of the item's current value. In certain embodiments, the value may be entered prior to operation. If this condition is satisfied, then a rule might include setting the item's current value to the entered value.

If the seventh condition is not satisfied, then the system may look to the next highest priority condition. In this example, the system looks to a catch-all condition. If this happens, then a rule might include marking the item's current value to an error (ERR) or not available (N/A), for example.

If the system computes the item's value (e.g., one of the seven conditions was satisfied), then an open P&L may be computed based on the computed value. The open P&L may be displayed to the user or used in some other electronic computation. A result of looking to a number of different conditions and using their corresponding rule(s) is that the system can selectively hone in on an appropriate, single value for the item. Unlike conventional systems that look to only a single price (e.g., only the last traded price), which can result in the use of an inappropriate value, the system described herein can intelligently select the best rule to be applied based on the state of the market (or certain market conditions)—especially when the bid-ask spread is wide, the market is thinly traded, and/or the market moves without trades—to determine the item's value.

While the above example is only an illustration, it is understood that modifications may be made. For example, the priority can be changed, the first condition could put into practice a margin of error by using the best bid price −X and the best ask price +X for the bid-ask range, the first condition could be skipped if a best bid or ask price is missing, the second condition could use weighted average based on available quantities, and/or a theoretical price could be used in one or more steps.

II. Example System for Computing an Item's Value

Figure 2:
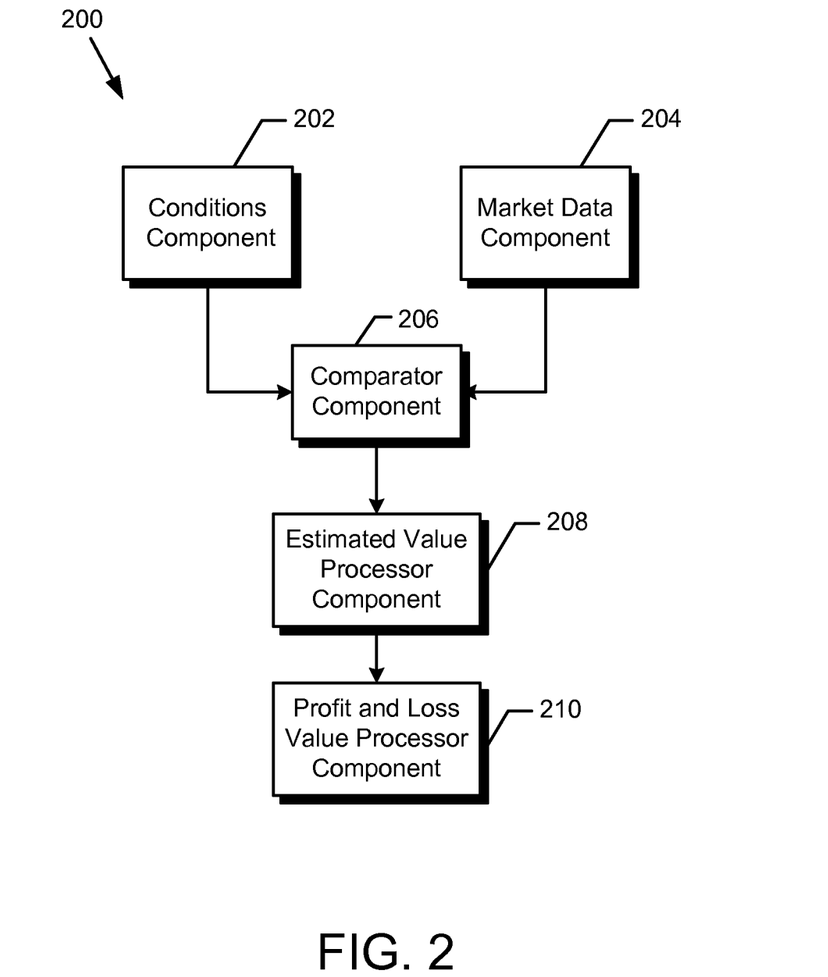
FIG. 2 is a block diagram illustrating an example system for determining, among other things, an item's value, according to an embodiment.

FIG. 2 is a block diagram illustrating an example system 200 for determining, among other things, an item's value, according to an embodiment. The system 200 includes a conditions component 202, market data component 204, comparator component 206, estimated value processor component 208, and profit and loss value component 210. Each component, for example, includes a software component (e.g., a program code), a hardware component, or a combination of software and hardware components.

Conditions component 202 receives and makes available the conditions and their corresponding rules. Conditions and rules can be input via a configuration window, hardcoded into the system, or a combination of manual entry and hardcoded, for example. Conditions component 202 may include an electronic data structure to hold the conditions and their corresponding rules, or provide links to the conditions and their rules, for example.

Market data component 204 receives and makes available the market data. In certain embodiments, market data originates from an electronic exchange, but may pass through one or more computer network devices before it is received by the market data component 204. The market data may include a best bid price (highest bid price), best ask price (lowest ask price), last traded price, open price, settlement price, and close price, for example.

It is understood that the exchange often determines the actual content of the market data. However, if a certain condition calls for a value that is not from the exchange, then the market data component 204 may too receive or compute the called-for value; for example, the market data component 204 may receive or compute a theoretical value that is based on market data from the exchange or some other source (e.g., a different market at the exchange, different exchange, news source that is not an exchange, and so on). In some embodiments, therefore, a trader may wish to use the market data (or some other data) to theoretically arrive at a value. A condition might include if a theoretical value is identified, then set the item's value to the theoretical value or a value based on the theoretical value.

If the exchange does not provide a particular value and that desired value is not made available via a component or some other process, then it is possible that a condition cannot use the particular value. In other words, the types of conditions that are used by system 200 may be limited to the actual data available by the market data component 204. In some embodiments, however, the condition may be considered not satisfied and passed over by the system.

Comparator component 206 identifies a condition via the conditions component 202 and identifies the relevant market data via the market data component 204 to determine whether the condition is satisfied. For example, the comparator component 206 may determine that a first condition is not satisfied, but then determine that a second condition is satisfied.

Estimated value processor component 208 may then determine a value of the item using a rule associated with the satisfied condition.

Profit and loss value processor component 210 may then compute an open P&L value based on the estimated value of the item. As described above, the computation of the open P&L is further based on other factors, like a trader's open position and an average price to get into that position.

Other components, in addition to or in place of the profit and loss value processor component 210, may use the output from the estimated value processor component 208. For example, a graphical display component (not shown in the figure) may display the estimated value to a user. As such, certain embodiments are not limited to the use of a profit and loss value processor component 210.

III. Example Electronic Trading System

Figure 3:
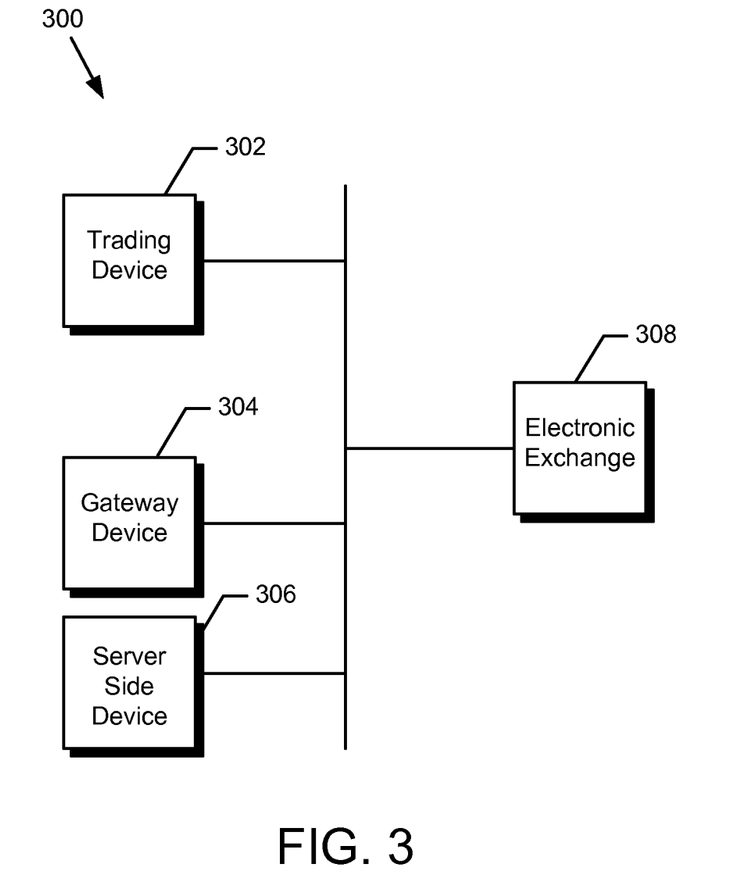
FIG. 3 is a block diagram illustrating an example system for employing certain embodiments described herein.

FIG. 3 is a block diagram illustrating an example system 300 for employing certain embodiments described herein. System 300 includes trading device 302 and electronic exchange 308. System 300 may also include gateway device 304 and server side device 306. According to the example of FIG. 3, the trading device 302 is in communication with gateway 304, which is communication with electronic exchange 308.

Before elaborating on system 300, it is understood that the components described in FIG. 2 may be implemented at one or more blocks described in FIG. 3. For example, trading device 302 might implement all of the components 202, 204, 206, 208, and 210 described in FIG. 2. Alternatively, trading device 302 might implement less than all of the components; for example, trading device 302 might only display the output from system 200. Likewise, gateway device 304, server side device 306, and electronic exchange 308 might each implement one or more components of system 200. That is, it is understood that a particular device 302, 304, 306, and 308 might implement all of system 200, just a portion of system 200, or a modified version of system 200. Also note that if server side device 306, for example, implemented the components of system 200 (at least through block 208), the item's value can be distributed over a network to a larger number of trading devices; this implementation might also help reduce the computational burden to compute the value on any one trading device.

In operation to trade, the trading device 302 may be used to send orders to buy or sell tradable objects at the exchange 308. The orders are sent through the gateway 304 to the exchange 308. In addition, market data is sent from the exchange 308 through the gateway 304 to the trading device 302. The trading device 302 may also be used to monitor this market data and base a decision to send an order for a tradable object on the market data.

The trading device 302 may include one or more electronic computing platforms such as a hand-held device, laptop, desktop computer, workstation with a single or multi-core processor, server with multiple processors, and/or cluster of computers, for example.

The trading device 302 may include one or more trading applications. The trading application(s) may, for example, process market data by arranging and displaying the market data in trading and charting windows. This processing may be based on user preferences, for example. By way of illustration, the trading device 302 may be a computing system running a copy of X_TRADER™, an electronic trading platform provided by Trading Technologies International, Inc. of Chicago, Ill.

The trading device 302 may include an electronic trading workstation, a portable trading device, an algorithmic trading or "black-box" system, an embedded trading system, and/or an automated trading tool, for example. The trading application(s) may include an automated trading tool such as an automated spread trading tool, for example.

The trading device 302 may be adapted to send orders to buy or sell tradable objects. The trading device 302 may also be adapted to cancel orders, change orders, and/or query an exchange, for example.

The orders sent by the trading device 302 may be sent at the request from a user or automatically, for example. For example, a trader may utilize an electronic trading workstation to place an order for a particular tradable object, manually providing various parameters for the order such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the trading device 302 includes a user interface. The user interface may include one or more display devices for presenting a text-based or graphical interface of a trading application to a user, for example. For example, the display devices may include computer monitors, hand-held device displays, projectors, and/or televisions. The user interface may be used by the user to specify or review parameters for an order using a trading application. The user interface may include one or more input devices for receiving input from a user, for example. For example, the input devices may include a keyboard, trackball, two or three-button mouse, and/or touch screen. The user interface may include other devices for interacting with a user. For example, information may be aurally provided to a user through a speaker and/or received through a microphone.

In certain embodiments, the orders from the trading device 302 are sent to the exchange 308 through the gateway 304. The trading device 302 may communicate with the gateway 304 using a local area network, a wide area network, a virtual private network, a T1 line, a T3 line, an ISDN line, a point-of-presence, and/or the Internet, for example.

The gateway 304 is adapted to communicate with the trading device 302 and the exchange 308. The gateway 304 facilitates communication between the trading device 302 and the exchange 308. For example, the gateway 304 may receive orders from the trading device 302 and transmit the orders to the exchange 308. As another example, the gateway 304 may receive market data from the exchange 308 and transmit the market data to the trading device 302.

In certain embodiments, the gateway 304 performs processing on data communicated between the trading device 302 and the exchange 308. For example, the gateway 304 may process an order received from the trading device 302 into a data format acceptable by the exchange 308. Similarly, the gateway 304 may transform market data in an exchange-specific format received from the exchange 308 into a format understood by the trading device 302. The processing performed by the gateway 304 may also include tracking orders from the trading device 302 and updating the status of the order based on fill confirmations received from the exchange 308, for example. As another example, the gateway 304 may coalesce market data from the exchange 308 and provide it to the trading device 302.

In certain embodiments, the gateway 304 provides services other than processing data communicated between the trading device 302 and the exchange 308. For example, the gateway 304 may provide risk processing, which may include performing one or more steps described herein to compute an estimated value for the item and an open P&L. Likewise, server side device 306 may provide similar risk processing as gateway 304.

The gateway 304 may include one or more electronic computing platforms such as a hand-held device, laptop, desktop computer, workstation with a single or multi-core processor, server with multiple processors, and/or cluster of computers, for example. Server-side device 306 may include a similar computer platform as gateway 304.

The gateway 304 may include one or more gateway applications. The gateway application(s) may, for example, handle order processing and market data processing. This processing may be based on user preferences, for example.

In certain embodiments, the gateway 304 communicates with the exchange 308 using a local area network, a wide area network, a virtual private network, a T1 line, a T3 line, an ISDN line, a point-of-presence, and/or the Internet, for example.

The exchange 308 is adapted to match orders to buy and sell tradable objects. The tradable objects may be listed for trading by the exchange 308. The orders may include orders received from the trading device 302, for example. Orders may be received from the trading device 302 through the gateway 304, for example. In addition, the orders may be received from other devices in communication with the exchange 308. That is, typically the exchange 308 will be in communication with a variety of other trading devices (which may be similar to trading device 302) that also provide orders to be matched.

As described above, the exchange 308 is adapted to provide market data. The market data may be provided directly to the trading device 302, for example. The market data may be provided to the trading device 302 through the gateway 304, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on either side of the inside market. As described above, the market data may also include information such as the last traded price (LTP), the last traded quantity (LTQ), and order fill information.

In certain embodiments, the system 300 includes more than one trading device 302. For example, multiple trading devices similar to the trading device 302, discussed above, may be in communication with the gateway 304 to send orders to the exchange 308.

In certain embodiments, the system 300 includes more than one gateway 304. For example, multiple gateways similar to the gateway 304, discussed above, may be in communication with the trading device 302 and the exchange 308. Such an arrangement may be used to provide redundancy should one gateway 304 fail, for example.

In certain embodiments, the system 300 includes more than one exchange 308. For example, the gateway 304 may be in communication with multiple exchanges similar to the exchange 308, discussed above. Such an arrangement may allow the trading device 302 to trade at more than one exchange through the gateway 304, for example.

In certain embodiments, the trading device 302 includes one or more computing devices or processing components. In other words, the functionality of the trading device 302 may be performed by more than one computing device. For example, one computing device may generate orders to be sent to the exchange 308 while another computing device may provide a graphical user interface to a trader. In certain embodiments, the gateway 304 includes one or more computing devices or processing components. In other words, the functionality of the gateway 304 may be performed by more than one computing device. In certain embodiments, the exchange 308 includes one or more computing devices or processing components. In other words, the functionality of the exchange 308 may be performed by more than one computing device.

In certain embodiments, the gateway 304 is part of the trading device 302. For example, the components of the gateway 304 may be part of the same computing platform as the trading device 302. As another example, the functionality of the gateway 304 may be performed by components of the trading device 302. In certain embodiments, the gateway 304 is not present. Such an arrangement may occur when the trading device 302 does not need to utilize the gateway 304 to communicate with the exchange 308, for example. For example, if the trading device 302 has been adapted to communicate directly with the exchange 308.

In certain embodiments, the gateway 304 is physically located at the same site as the trading device 302. In certain embodiments, the gateway 304 is physically located at the same site as the exchange 308. In certain embodiments, the trading device 302 is physically located at the same site as the exchange 308. In certain embodiments, the gateway 304 is physically located at a site separate from both the trading device 302 and the exchange 308.

While not shown for the sake of clarity, in certain embodiments, the system 300 may include other devices that are specific to the communications architecture such as middleware, firewalls, hubs, switches, routers, exchange-specific communication equipment, modems, security managers, and/or encryption/decryption devices.

IV. Example Screenshot

Figure 4:
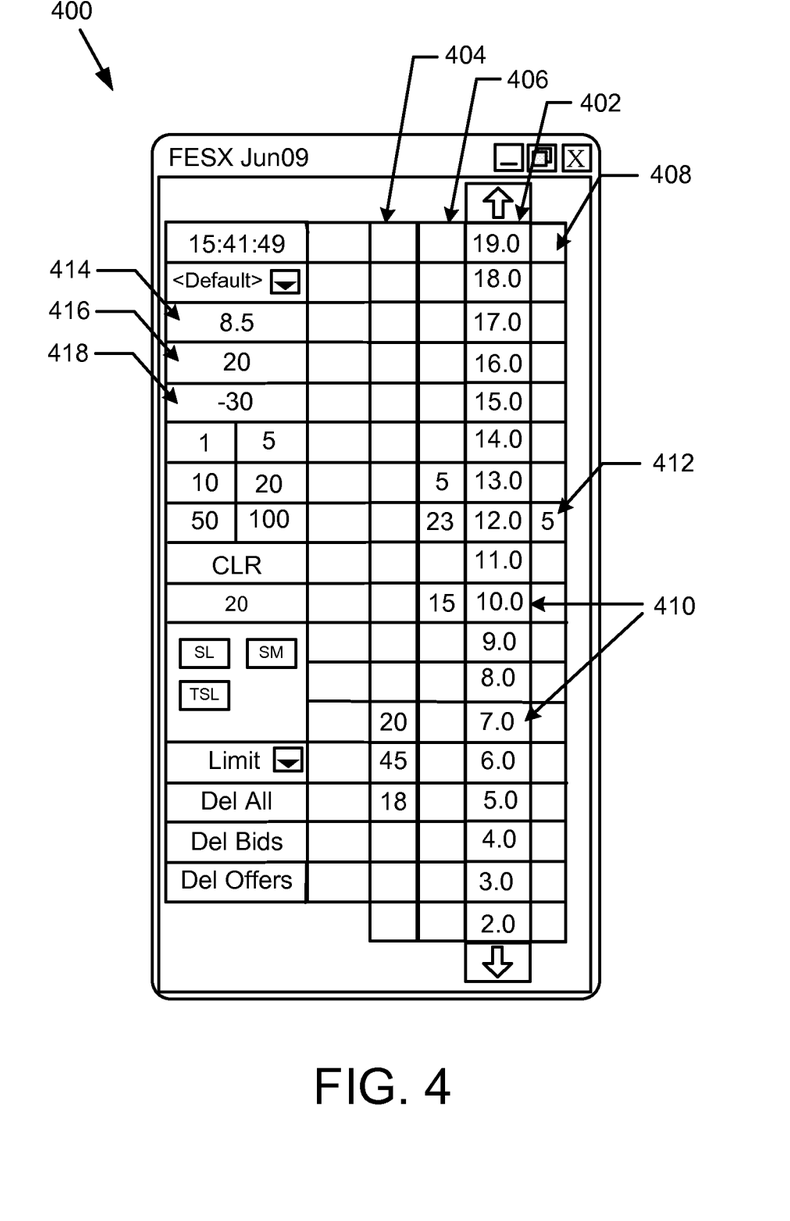
FIG. 4 is a screenshot that is used to illustrate certain embodiments described herein.

FIG. 4 illustrates an example trading interface 400 for trading an item in an electronic trading system in which certain embodiments may be employed. The trading interface 400 includes a price column 402, a bid quantity column 404, an ask quantity column 406, and a last traded price column 408 for the item. The price column 402 includes price levels (or values based on price). The bid quantity column 404 includes bid quantity indicators. The ask quantity column 406 includes ask quantity indicators. The bid quantity indicators and ask quantity indicators are aligned with the corresponding price level of the price column 402. The inside market 410 includes the best bid price and the best ask price. The last traded price column includes a last traded price indicator 412 that moves relative to the price levels along the price column 402.

Trading interface 400 also shows an estimated value of the item at 414, user's position at 416, and the user's open P&L at 418. Using the conditions from the example above, the estimated value is determined to be the average of the best bid price, 7.0, and the best ask price, 10.0, which is 8.5 and shown at 414. (Note that the first condition was not satisfied given that the last traded price is outside of the bid-ask range. However, there is a valid bid and ask price, so the second condition is satisfied; thus, rule 2 was used to compute the estimated value.) Assuming that the trader is long 20 contracts (shown at 416) at an average price of 10, then the trader's open P&L is −$30 if each tick is worth one U.S. dollar (shown at 418).

The estimated value can be updated periodically, based on a change in the market, based on a change in the user's position, or based on some other event.

As used herein, a "tradable object" refers to anything that can be traded with a price, a quantity, or both price and quantity. For example, financial products such as stocks, options, bonds, futures, currency, warrants, funds derivatives, commodities, and collections or combinations of these may be tradable objects. A tradable object may be "real" or "synthetic." A real tradable object includes products that are listed by an exchange. A synthetic tradable object includes products that are defined by the user and are not listed by an exchange. For example, a synthetic tradable object may include a combination of real (or other synthetic) products such as a synthetic spread. A tradable object may also include traded events or goods, for example.

While the inventions have been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from the spirit or scope of the present inventions. Therefore, it is intended that the inventions not be limited to the particular embodiments disclosed herein.

What is claimed is:

1. A computer-implemented method comprising:
   receiving, by a gateway in communication with an electronic exchange, a first market data update from the electronic exchange during a trading session, wherein the first market data update comprises a first last traded price available for a tradeable object at a first time during the trading session;
   identifying, by the gateway, a plurality of conditions, wherein each condition of the plurality of conditions is associated with a market condition, and wherein the market condition associated with each condition is associated with a rule;
   determining, by the gateway, during the trading session, that a first market condition of a first condition of the plurality of conditions is satisfied by identifying that the first last traded price in a first market update is below a first best bid price or above a first best ask price in the first market update, and only one of the first best bid price and the first best ask price is identified in the first market update;
   setting, by the gateway, a current value of the tradeable object to the first last traded price based on a rule associated with the first condition;
   providing, by the gateway, the current value of the tradeable object to a processor component of a risk management system in communication with the gateway;

receiving, by the gateway, a second market update including market data corresponding to market conditions for the tradeable object, wherein the second market update comprises at least one of the following market data for the tradeable object: a second best bid price, a second best ask price, and a second last traded price available for the tradeable object at a second time during the trading session, wherein the second time is later than the first time;

determining, by the gateway, during the trading session, that, the first market condition of the first condition is satisfied based on the second market update;

updating, by the gateway, the current value of the tradeable object to the second last traded price;

providing, by the gateway, the updated current value of the tradeable object, to the processor component of the risk management system;

determining, by the risk management system in communication with the gateway, a margin value based on the provided updated current value of the tradeable object;

adjusting, by the risk management system, a margin requirement based on the determined margin value;

providing, by the risk management system, the adjusted margin requirement to a trading device in communication with the risk management system and the gateway;

displaying, by the trading device, an indicator in a user interface provided by the trading device, wherein the indicator represents the adjusted margin requirement in relation to an indicator of the tradeable object; and sending, by the trading device in response to receiving the provided adjusted margin requirement, an order for the tradeable object, wherein the order is sent to the gateway in communication with the electronic exchange.

2. The method of claim 1, further comprising:
identifying a priority level for each condition of the plurality of conditions.

3. The method of claim 2, wherein determining which of the plurality of conditions is satisfied is performed in a sequence starting from a condition of highest priority until one of the plurality of conditions is satisfied.

4. The method of claim 1, further comprising:
determining a profit and loss value based on the current value of the tradeable object.

5. The method of claim 1, wherein the gateway comprises one or more specially configured computers.

6. The method of claim 1, further comprising:
displaying, by the gateway, a configuration window that is configured to receive the plurality of conditions.

7. The method of claim 6, wherein the configuration window is further configured to receive a priority level for each of the plurality of conditions.

8. The method of claim 1, wherein the processor component of the risk management system is a profit and loss value computation component.

9. The method of claim 1, wherein the processor component of the risk management system is a graphical display component.

10. The method of claim 1, further comprising:
calculating by the processor component of the risk management system an open profit and loss value based on the current value of the tradeable object.

11. The method of claim 10, wherein the open profit and loss value is further based on an open position for a trader.

12. The method of claim 10, wherein the open profit and loss value is further based on an average price for an open position for a trader.

13. The method of claim 1, wherein the risk management system is the gateway.

* * * * *